Patented Sept. 4, 1951

2,566,941

UNITED STATES PATENT OFFICE 2,566,941

METHOD AND AGENT FOR CONTROLLING UNDESIRABLE FERMENTATION IN CHEESE

Holger Jørgensen, Copenhagen, Denmark, assignor to Aktieselskabet Dansk Gaerings-Industri, Copenhagen, Denmark No Drawing. Application August 7, 1947, Serial No. 767,357. In Denmark December 6, 1945
Section 1, Public Law 690, August 8, 1946
Patent expires December 6, 1965

5 Claims. (Cl. 99—116)

This invention relates to a method for the checking of butyric acid fermentation and other undesirable bacteria fermentation in cheese and other preserves, and to an agent for application in this method.

One of the most dreaded calamities in the production of cheese is that during the storage of the cheese a blowing occurs, i. e. an excessive development of gases, consisting wholly or partly of hydrogen, in the solid cheese mass. The blowing especially often happens in the case of the so called Emmenthaler cheese. This blowing phenomenon which is due to the development of anaerobic gas producing bacteria, e. g. butyric acid bacteria, in the cheese mass may be so violent that originally flat (millstone shaped) cheeses may become almost spherical. The so called cheese spreads or process cheeses are also exposed to blowing phenomena which, in case that the cheese is packed in boxes, may even cause the lid to blow off the latter.

A similar phenomenon may occur in the production of preserves enclosed in hermetically closed containers and may in the case of canned preserves entail that the cans bulge out or swell.

In my U. S. A. Patent No. 2,291,632, and in my U. S. A. patent application, Serial No. 767,356 filed of even date herewith, which is now abandoned methods are claimed for the checking of blowing and swelling, respectively, consisting in that in the cheese mass or in the preserved foodstuffs to be stored in hermetically closed containers, a slight quantity of a soluble bromate or iodate is incorporated. The effect of the bromates and iodates is due to the fact that they give the liquid phase at hand a high redox potential whereby the vitality of the detrimental micro-organisms is checked and is contingently brought to a complete stop.

In accordance with the present invention one may instead of bromates and iodates use a soluble chlorite, e. g. sodium chlorite $NaClO_2$, as these substances may likewise effect a suitable increase in the oxidation level. In accordance with the invention one therefore at some time or other during the production of cheese or other preserves, before the storage, however, incorporates a slight quantity of a soluble chlorite therein.

Up to this date, chlorites have only very seldom been used for technical purposes. They have, however, been used as addition to flour in order to increase the baking ability, sodium chlorite having been proposed for that purpose.

The invention also relates to an agent to be applied in the said method, which agent is characterized in that it consists of or contains a soluble chlorite, e. g. sodium chlorite.

The agent may in accordance with the invention contain suitable extenders and likewise it may contain stabilizers for the chlorite, which may be desirable in cases where the agent is exposed to a prolonged storage before the use, contingently under unfavourable conditions. Besides chlorites the agent may furthermore contain one or more other substances which likewise serve the checking of undesirable bacteria fermentation, e. g. a soluble bromate or iodate.

I claim:

1. The process of preventing anaerobic fermentation, due to the presence of anaerobic bacteria, in cheese encased in an hermetically sealed container which comprises incorporating a small amount of a soluble chlorite in said cheese prior to encasing the cheese in the container.

2. The process as in claim 1 wherein the chlorite is sodium chlorite.

3. The method of reducing the tendency of cheese to blow during storage due to the action thereon of anaerobic bacteria which comprises incorporating in the cheese before the storage thereof a small amount of a salt comprising a water-soluble chlorite.

4. A food product comprising cheese normally subject to decomposition by anaerobic bacteria containing a small quantity sufficient to stabilize the same against decomposition comprising a soluble chlorite.

5. A product as defined in claim 4 wherein the chlorite is sodium chlorite.

HOLGER JØRGENSEN.

REFERENCES CITED

The following references are of record in the file of this patent:

UNITED STATES PATENTS

| Number | Name | Date |
|---|---|---|
| 2,291,632 | Jorgensen | Aug. 4, 1942 |
| 2,389,302 | Evans | Nov. 20, 1945 |
| 2,478,043 | Evans | Aug. 2, 1949 |

OTHER REFERENCES

Cereal Chemistry, Nov. 1941, vol. XVIII, No. 6, pages 699 to 704.